May 10, 1960     D. W. WANER     2,936,405

PHOTOGRAPHIC PRINTING METHOD AND APPARATUS

Filed May 20, 1954     3 Sheets-Sheet 1

INVENTOR.
DONALD W. WANER
BY
ATTORNEYS

May 10, 1960 D. W. WANER 2,936,405
PHOTOGRAPHIC PRINTING METHOD AND APPARATUS
Filed May 20, 1954 3 Sheets-Sheet 3

INVENTOR.
DONALD W. WANER
BY
ATTORNEYS

# United States Patent Office 2,936,405
Patented May 10, 1960

2,936,405

PHOTOGRAPHIC PRINTING METHOD AND APPARATUS

Donald W. Waner, Cuyahoga Falls, Ohio, assignor to The Morse Instrument Co., Hudson, Ohio, a corporation of Ohio Application May 20, 1954, Serial No. 431,152

6 Claims. (Cl. 315—312)

This invention relates to a new and improved method for the printing of photographic contact paper. More particularly, this invention relates to an apparatus for the printing of variable contrast paper and to a method whereby variable contrast paper is exposed to predetermined amounts of polychromatic illumination so that the contact prints produced thereby will be uniform in contrast or sharpness.

Variable contrast printing papers are printing papers having emulsions which are sensitized to respond to a polychromatic light source, including blue, green and yellow. The demand for variable contrast papers has arisen mainly in the field of aerial photo reconnaissance where it is desirable to produce finished prints of uniform contrast and sharpness, regardless of the condition of the negative. Within one roll of exposed film, changes in type of terrain or in lighting conditions cause substantial differences in the individual negatives. The inferior quality of the negatives can be compensated for by varying the color from the polychromatic source within a predetermined printing cycle or exposure time.

There are now available commercially at least two variable contrast papers having excellent variable response characteristics. A paper which responds with its lowest contrast to blue light and its highest contrast to yellow light is available from the Eastman Kodak Co. A paper which has its lowest contrast when exposed to yellow light, and its highest contrast when exposed to blue light is available from the Du Pont Co., and is distributed under the trademark "Varigam."

Early attempts at contrast control included the development of contact printing papers in which the emulsion or emulsions were responsive to only one light color; such as blues, greens or yellows. The use of these conventional or fixed contrast papers required that the operator choose from several different papers to print each negative. This necessitated frequent changing of paper within the printing apparatus with obvious disadvantages.

Printing devices, that is, the apparatus by which the finished print is produced, have been developed which do partially utilize the response characteristics of the improved Eastman and Du Pont variable contrast printing papers. However, none of the present day printers fully utilize the range of color response characteristic of the improved variable contrast papers. The known printers generally vary the color of the light source by placing suitable filters between the light source and the sensitized paper. The color, once chosen by the operator, remains the same throughout the entire exposure time. The exposure time is determined and controlled by a means separate from the color selection means. Heretofore, it has not been possible to change or vary the color from a polychromatic source while printing during a predetermined exposure time.

The known printers are usually of the contact or projection type. Certain of the contact printers are equipped with a striated filter. The operator changes the color of the printing light source by moving a filter having alternate blue and yellow filter stripes on a glass plate, over a second glass plate carrying alternate opaque and clear stripes. As the plate with the color stripes is moved over the shutter plate either all blue light, all yellow light, or any proportionate mixture of the two is transmitted to the sensitized material. When the desired color has been selected, the filters are locked in position, and the printing cycle is begun.

Another present day printer uses two separate light sources, one filtered blue and the other yellow. The two lamps are controlled through counter-opposed rheostats. The operator uses a single control knob to effect a simultaneous increase in voltage on one lamp and a decrease on the other. When the desired color has been selected, the printing cycle is begun.

The projection type printer may be equipped with a filter wheel which carries up to 10 filters ranging from blue to yellow. The operator rotates the wheel to produce the desired contrast response from the variable contrast paper. Once the color desired has been selected, the printing cycle is begun.

In using each of the above described printing devices, it is possible to vary only the time of exposure, characteristic color of the light source and the intensity of the light source. It is not possible to produce more than one characteristic color for each printing cycle. The above printing devices cannot produce an exposure wherein the colors are complementary to each other for a given period of time and then one color alone is continued for an additional period of time. In other words, the characteristic color cannot be polychromatic and then changed monochromatic, all within a given printing cycle.

Therefore, it is an object of this invention to provide a printing apparatus or device that will produce more than one characteristic color from a polychromatic source during each printing cycle.

Further, it is an object of this invention to provide a printing apparatus which will electronically control both the characteristic color of the light transmitted from a polychromatic source to a sensitized material and the total elapsed time in each printing cycle.

Still further, it is an object of this invention to provide a method whereby the response characteristics of variable contrast paper will be fully utilized by exposing the paper, through a negative, to one or more characteristic colors from a polychromatic source during a predetermined printing cycle.

Other objects and advantages of the present invention will be apparent in view of the following detailed description of embodiments thereof, taken in connection with the attached drawings in which like numerals refer to like components in the several views, and in which.

Figure 1:
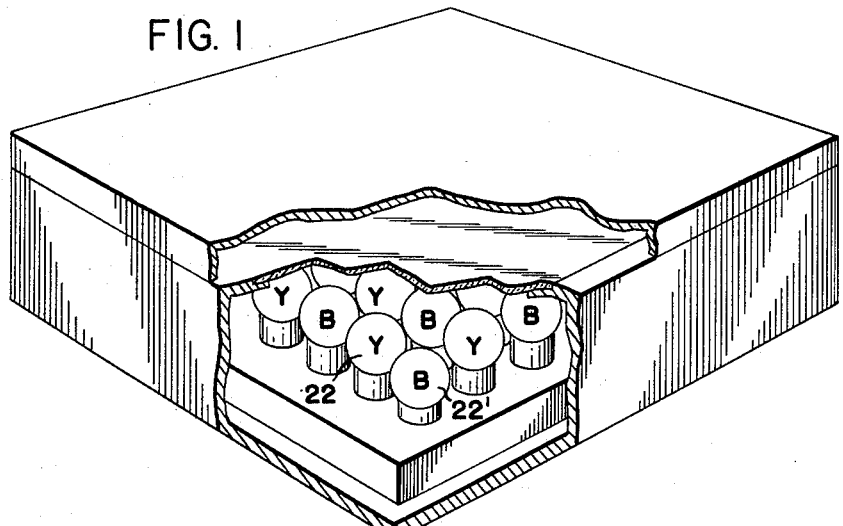
Fig. 1 is a sectional elevational view showing a contact type of printer having two banks of blue and yellow lamps arranged in a "checkerboard" manner.
Figure 4:
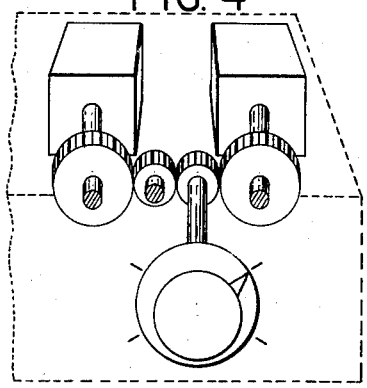

Fig. 4 is a view of still another means for producing a complementary time cycle for the banks of blue and yellow lamps shown in Fig. 1. Two mechanical timers having linear characteristics are used with a gear train whereby each may be set at a given time from a single control. The gear train is arranged as shown so that when one timer is at maximum time, the other is at zero, and vice versa.

Figure 5:
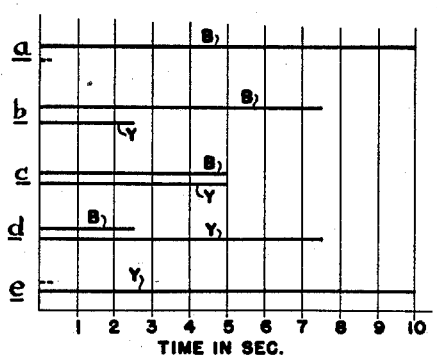

Fig. 5 is intended to illustrate the use of the banks of lamps shown in Fig. 1, either alone, or complementary to each other.

Figure 3:
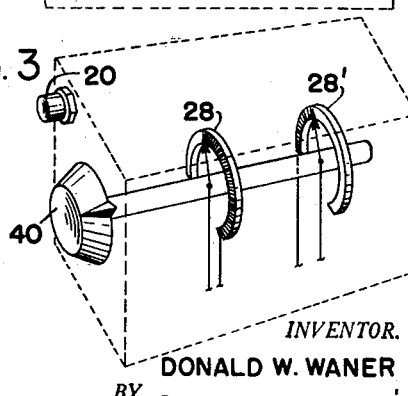
Fig. 3 is a view of a control unit similar to Fig. 2 except that there is no dial for setting the period of lamp illumination.
Figure 6:
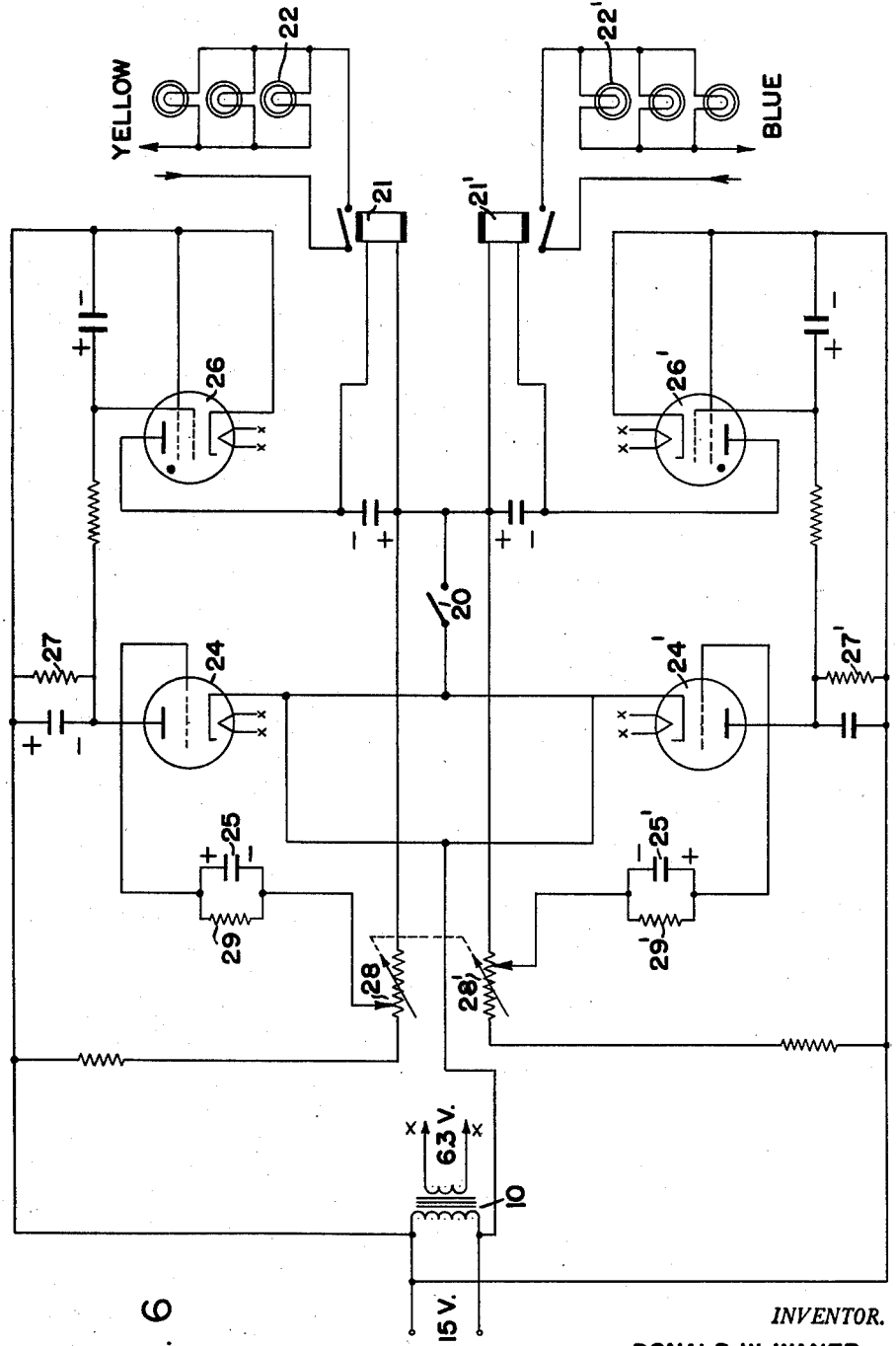

Fig. 6 is a schematic wiring diagram of an electronic circuit using the control unit shown in Fig. 3.

Figure 2:
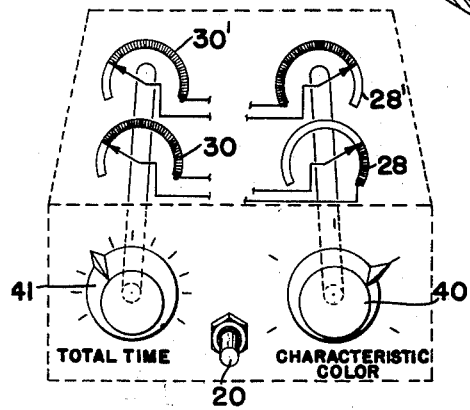
Fig. 2 is a view of a control unit having a contact switch, a dial for setting two potentiometers so as to obtain a predetermined time of lamp illumination and a dial for setting two potentiometers so as to control the current flow to the banks of blue and yellow lamps shown in Fig. 1.
Figure 7:
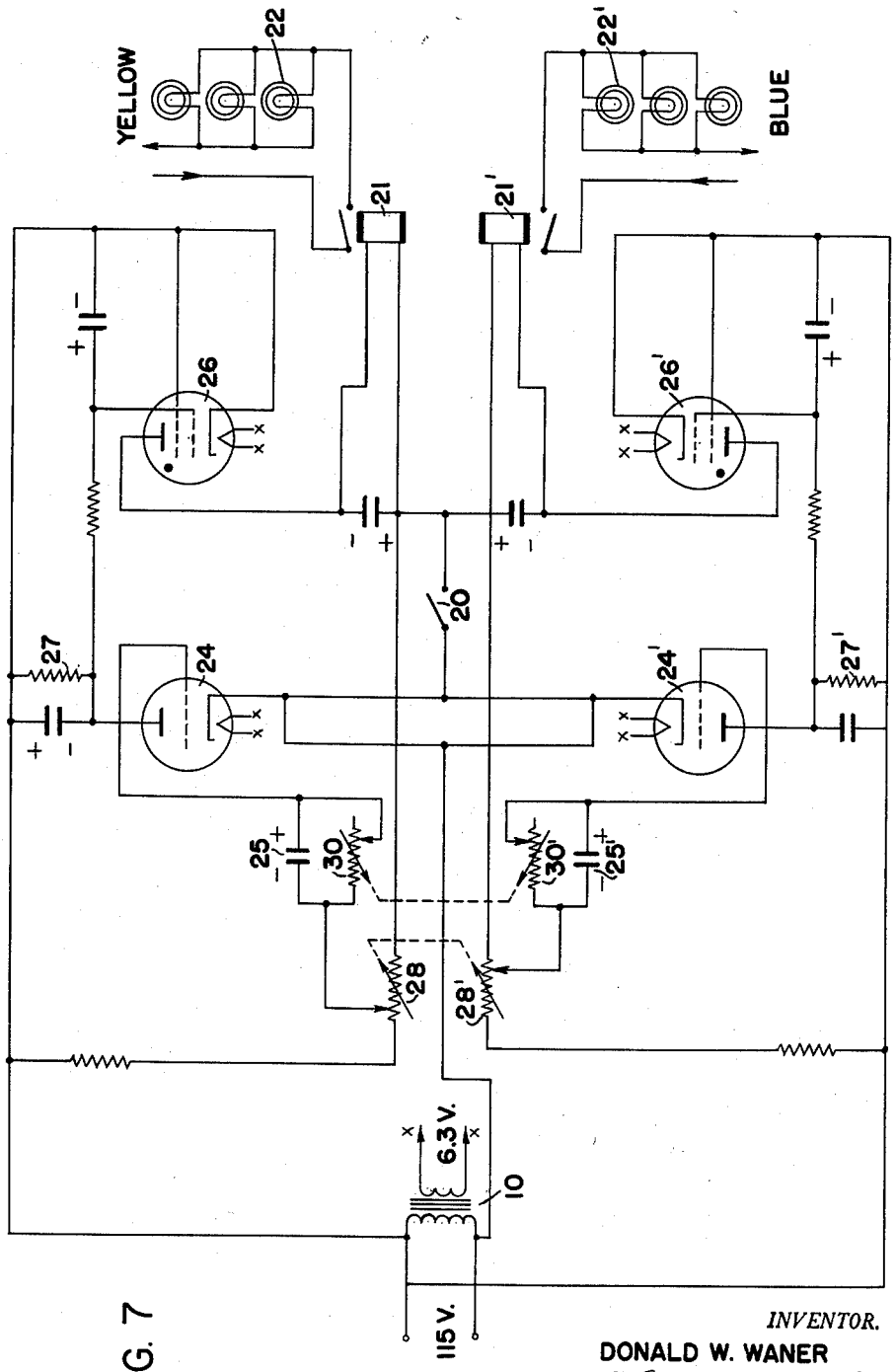

Fig. 7 is a schematic wiring diagram of an electronic circuit using the control unit shown in Fig. 2.

In its broadest aspects, the present invention relates to a method whereby variable contrast photographic printing paper is exposed to light from a polychromatic source, shown in a preferred embodiment as two banks of electric lamps, one blue and one yellow, so as to fully utilize the response characteristics of the variable contrast paper. By means of an electronic control system, it is possible to light the separate banks of bulbs for a predetermined length of time. It is further possible to have both lamp banks on simultaneously and complementary to each other, or, to keep one lamp bank on for the total of the predetermined length of time, with the other bank being off. That is, both lamp banks would go on together, but one would stay on longer.

By way of example, if the maximum total exposure or illumination time required is determined by the operator to be 15 seconds, the blue bank may be on for the full 15 seconds, and the yellow bank would not be on at all, or vice versa. Also, the blue bank may be on for 5 to 10 seconds, while the yellow bank would be on for 10 to 5 seconds. In other words, the total "lamp seconds" would be 15.

Referring now to the drawings, Fig. 6 illustrates one embodiment of the present invention. Each of the banks of lamps shown in Fig. 1, one blue and one yellow, are controlled by a single pole single throw relay, 21 and 21′ and are illuminated by power from a conventional source (not shown). When relay 21 is energized the yellow lamps 22 are illuminated. When relay 21′ is energized the blue lamps 22′ are illuminated.

To begin a printing cycle, a momentary contact switch 20 is closed. While switch 20 is open, current is flowing from power source 10 to vacuum tubes 24 and 24′. The grid and cathode of tubes 24 and 24′ are acting as a diode and are charging the capacitors 25 and 25′. Switch 20 being open, no plate current is applied to thyratron tubes 26 and 26′; therefore no plate current will flow and relays 21 and 21′ will be de-energized and open.

When switch 20 is closed, the charge on capacitors 25 and 25′ biases tubes 24 and 24′ beyond the cutoff point and no current flows through tubes 24 and 24′ and plate load resistors 27 and 27′. With no current flowing through resistors 27 and 27′, no bias is applied to the grid of tubes 26 and 26′ and the current will flow through relays 21 and 21′, energizing them and illuminating the banks of yellow lamps 22 and blue lamps 22′. From the time switch 20 is closed until the lamps 22 and 22′ are illuminated, approximately one second will have elapsed.

The length of time during which relays 21 and 21′ will remain energized and lamps 22 and 22′ illuminated is dependent upon the resistance of potentiometers 28 and 28′, and the values of resistors 29 and 29′ and parallel capacitors 25 and 25′. The shortest timing cycle is obtained by setting potentiometers 28 and 28′ at zero resistance, and the longest cycle at full resistance.

Potentiometers 28 and 28′, as shown in Fig. 3, mounted on a common shaft controlled by dial 40, are of equal resistance and have linear characteristics. They are used as timing controls in two typical R.-C. circuits, but are wired (each in its own circuit) in such a way that when one is completely in the circuit, the other is completely out. The amount of resistance in each circuit, as established by the setting of potentiometers 28 and 28′, determines the point at which the charge on capacitor 25 or 25′ no longer biases tubes 24 or 24′ to cutoff. As capacitors 25 and 25′ discharge through parallel resistors 29 and 29′, the voltage across capacitors 25 and 25′ gradually decreases until it is approximately equal to the voltage between the center tap and the end of potentiometers 28 and 28′. When the voltage becomes approximately equal, tubes 24 and 24′ will conduct plate current which flows through resistors 27 and 27′. The resulting voltage drop across resistors 27 and 27′ is applied as a negative bias to thyratron tubes 26 and 26′. The plate voltage to tubes 26 and 26′ is pulsating D.C. and the D.C. bias applied to the grids stops the plate current flow. This in turn de-energizes relays 21 and 21′ and lamps 22 and 22′ go out, thus completing the printing cycle.

It may thus be seen that varying the resistance on potentiometers 28 and 28′ will vary the length of time during which relays 21 and 21′ will be energized and lamps 22 and 22′ illuminated. With the two equal and linear potentiometers on a common shaft, and set complementary to each other, the time during which each bank of lamps is illuminated will be in a ratio to each other. The banks of lamps will go on individually or simultaneously for a total "lamp-second" time equal to the total value of the maximum resistance set on the individual potentiometers 28 and 28′. The length of the printing cycle is dependent upon the highest resistance value set on potentiometers 28 or 28′.

It may however, be desirable to have the duration of the printing cycle, or the total exposure time, controlled independently of the complementary relation of the two banks of lamps with each other. For example, a ratio of four times as much blue light as there is yellow might be desired. This ratio is established by setting dial 40 shown in Fig. 2. The printing cycle time is determined by setting dial 41 shown in Fig. 2.

Referring now to Fig. 7, the parallel resistors 29 and 29′ as shown in Fig. 6 are replaced with potentiometers 30 and 30′, shown in Fig. 2, as mounted on a common shaft controlled by dial 41, and having equal resistance and linear characteristics. Potentiometers 30 and 30′ are connected into the circuit in such a manner that both will have the same effective resistance in their respective circuits, the resistance being of such a value as to give the required duration of the printing cycle.

The printing cycle of the control circuit in Fig. 7 is also actuated by momentarily closing switch 20. As in Fig. 6, the amount of resistance in potentiometers 28 and 28′ determines the point at which the charge on capacitors 25 and 25′ no longer biases tubes 24 and 24′ to cutoff. However, inasmuch as capacitors 25 and 25′ now discharge through the variable resistance of potentiometers 30 and 30′, the rate at which the voltage drops across capacitors 25 and 25′ can be varied. When this voltage is approximately equal to the voltage on potentiometers 28 and 28′, tubes 24 and 24′ will conduct plate current which flows through resistors 27 and 27′ and biases thyratron tubes 26 and 26′, de-energizing relays 21 and 21′ and shutting off lamps 22 and 22′.

It may thus be seen that the control circuit of Fig. 7 will result in complementary cycles for the yellow and blue bulk banks, and that the total "lamp-seconds" will always be equal to the time set by the "total-time" potentiometers 30 and 30′.

By way of example, Fig. 5 is illustrative of some possible variations in characteristic color for a fixed "lamp-second" time and is intended to be of assistance in understanding the aforegoing disclosure and description of certain preferred embodiments of this invention. As shown by line a, only blue lamps may be illuminated for 10 lamp-seconds. Or as shown by line b, blue may be illuminated for 7½ seconds and yellow for 2½ seconds, totaling 10 lamp-seconds. Both blue and yellow may be illuminated for 5 seconds each, as shown by line c. Line d is similar to line b except that yellow lamps may be illuminated for 7½ seconds and blue for 2½. Finally, yellow alone may be illuminated for the full exposure time of 10 lamp seconds as shown by line e. The value of 10 lamp-seconds and the ratios in lines a—e are for illustrative purposes only. The values chosen in an actual printing operation would be dependent upon the variable contrast photographic print paper being used, the condition of the negatives and the degree of contrast and sharpness desired for the finished print.

The apparatus for the printing of variable contrast paper and the method whereby variable contrast paper is exposed to predetermined amounts of polychromatic illumination so that the contact prints produced thereby will be uniform in contrast or sharpness will be useful not only in the field of aerial photography but will also be a significant contribution to the photographic art in general.

The electronic control unit for the printing aparatus and the method of printing variable contrast paper shown and described herein may be utilized with printing devices of the contact or projection types.

While certain particular embodiments of the present invention have been shown and described, it will be obvious to those skilled in the art that changes and modifications may be made without departing from the invention in its broader aspects, and therefore the appended claims are intended to cover all such changes and modifications as fall within the true spirit and scope of the invention.

What is claimed is:

1. Apparatus for the printing of variable contrast printing paper by exposure to polychromatic light comprising, a bank of blue lamps and a bank of yellow lamps, a power source for constant intensity illumination of said lamps, individual switch means for controlling illumination of said lamps, individual electronic circuit means for actuating each of said switch means, a capacitor means in each circuit controlling the illumination of said lamps by said switch means, a first pair of potentiometers, one in each of said circuits, a first rotatable shaft coupling said first pair of potentiometers together for establishing that each will have the same resistance value when adjusted, a second pair of potentiometers, one controlling each of said circuits, and a second rotatable shaft coupling said second pair of potentiometers together for establishing a total preselected resistance value for said potentiometers irrespective of the individual adjustment of each potentiometer, said preselected value being determined by the adjustment of said first pair of potentiometers.

2. Apparatus for the printing of variable contrast paper by exposure to polychromatic light, comprising, power sources supplying line current, at least two characteristic color sources illuminated by said line currents, individual switch means controlling the flow of current between each of said color sources and its power source, said color sources being illuminated when said switch means are closed, and, individual switch control means independent of said power sources for closing said switch means, each said switch control means including an electronic cricuit with a capacitor therein, each said switch means being closed while said capacitor is charging.

3. Apparatus for the printing of variable contrast paper by exposure to polychromatic light, comprising, power sources supplying line current, at least two characteristic color sources illuminated by said line currents, individual switch means controlling the flow of current between each of said color sources and its power source, said color sources being illuminated when said switch means are closed, individual switch control means independent of said power sources for closing said switch means, each said switch control means including an electronic circuit wtih a capacitor, and an adjustable resistance means in each electronic circuit, each said switch means being closed while said capacitor is charging, the charging potential of each said capacitor being controlled by said adjustable resistance means.

4. Apparatus according to claim 3 in which the adjustable resistance means of each switch control means electronic circuit are mechanically coupled together for establishing a total preselected resistance value irrespective of the resistance value of each resistance means.

5. Apparatus for the printing of variable contrast printing paper by exposure to polychromatic light comprising, at least two characteristic color sources, each having a constant intensity of illumination, individual switch means for controlling illumination of said color sources, individual electronic circuit means for actuating each of said switch means, a capacitor means in each circuit controlling illumination of said color sources by said switch means, first adjustable resistance means in each circuit controlling the charging potential of said capacitor, mechanical means coupling said first resistance means together for establishing that each will have the same resistance when adjusted, additional or second individual adjustable resistance means for controlling each of said circuits, and mechanical means coupling said second resistance means together for establishing a total preselected resistance value for all of said second resistance means irrespective of the individual adjustment of each of said second resistance means, said preselected value being determined by the adjustment of said first resistance means.

6. Apparatus for the printing of variable contrast printing paper by exposure to polychromatic light comprising, at least two characteristic color sources each having a constant intensity of illumination, individual switch means for controlling illumination thereof, individual electronc circuit means for actuating each of said switch means, a capacitor means in each circuit controlling illumination of said color sources by said switch means, individual potentiometers in each circuit controlling the charging potential of said capacitor, mechanical means coupling said first potentiometers together for establishing that each will have the same resistance value when adjusted, additional individual potentiometers for controlling each of said circuits, and mechanical means coupling said additional or second potentiometers together for establishing a total preselected resistance vlaue for all of said potentiometers at a value irrespective of the individual adjustment of each potentiometer, said preselected value being determined by the adjustment of said first potentiometers.

References Cited in the file of this patent

UNITED STATES PATENTS

| 460,199 | Cushins | Sept. 29, 1891 |
|---|---|---|
| 1,677,665 | Weaver | July 17, 1927 |
| 1,804,727 | Weaver | May 12, 1931 |
| 1,872,154 | Masek | Aug. 16, 1932 |
| 2,202,026 | Renwick | May 28, 1940 |
| 2,256,064 | Tupper | Sept. 16, 1941 |
| 2,291,347 | Ryan | July 28, 1942 |
| 2,306,666 | Simmon | Dec. 29, 1942 |
| 2,346,988 | Noel | Apr. 18, 1944 |
| 2,357,541 | Pfeil | Sept. 5, 1944 |
| 2,359,784 | Paulas | Oct. 10, 1944 |
| 2,402,660 | O'Grady | June 25, 1946 |
| 2,462,340 | Simmon et al. | Feb. 22, 1949 |
| 2,470,584 | Simmon | May 17, 1949 |
| 2,657,338 | Williams | Oct. 27, 1953 |
| 2,728,845 | Potter | Dec. 27, 1955 |

FOREIGN PATENTS

| 557,399 | Great Britain | Nov. 18, 1943 |